(12) United States Patent
Handshaw et al.

(10) Patent No.: US 12,541,753 B2
(45) Date of Patent: Feb. 3, 2026

(54) DETECTION OF BARCODE MISPLACEMENT BASED ON REPETITIVE PRODUCT DETECTION

(71) Applicant: ZEBRA TECHNOLOGIES CORPORATION, Lincolnshire, IL (US)

(72) Inventors: Darran Michael Handshaw, Sound Beach, NY (US); Yuri Astvatsaturov, Lake Forest, IL (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 329 days.

(21) Appl. No.: 18/114,925

(22) Filed: Feb. 27, 2023

(65) Prior Publication Data
US 2024/0289763 A1 Aug. 29, 2024

(51) Int. Cl.
*G06Q 20/20* (2012.01)

(52) U.S. Cl.
CPC .................................. *G06Q 20/208* (2013.01)

(58) Field of Classification Search
CPC .. G06Q 10/087; G06Q 10/208; G07G 1/0045; G07G 1/0063; G07G 3/003
See application file for complete search history.

(56) References Cited

U.S. PATENT DOCUMENTS

| 2020/0065537 | A1 | 2/2020 | He et al. |
| 2020/0184292 | A1 | 6/2020 | O'Hagan |
| 2023/0005342 | A1* | 1/2023 | Brakob ................ G07G 1/0045 |
| 2023/0036254 | A1 | 2/2023 | Arthanari et al. |

OTHER PUBLICATIONS

International Search Report and Written Opinion for International Application No. PCT/US24/12136.

* cited by examiner

*Primary Examiner* — Ariel J Yu
*Assistant Examiner* — Denisse Y Ortiz Roman
(74) *Attorney, Agent, or Firm* — Yuri Astvatsaturov (57) ABSTRACT

Techniques for product scanning are provided herein. The techniques may include analyzing a first set of images of items passing through a product scanning region of a indicia reader to decode a first indicia associated with a first item; analyzing the first set of images to determine first parameters related to characteristics of the first item; storing the first parameters locally on a memory associated with the indicia reader; analyzing a second set of images of items passing through the product scanning region to decode a second indicia associated with a second item in the second set of images; analyzing the second set of images to determine second parameters related to characteristics of the second item, and, in response to the decoded first and second indicia being the same, comparing the first and second parameters, and generating an alert based on a difference between the first and second parameters.

24 Claims, 4 Drawing Sheets

DETECTION OF BARCODE MISPLACEMENT BASED ON REPETITIVE PRODUCT DETECTION

BACKGROUND

It is important that barcodes or other indicia associated with inventory management remain affixed to their respective items. There exists a need for simplified systems and methods that can monitor instances of barcode misplacement.

SUMMARY

In an embodiment, the present invention is a system for product scanning, comprising: one or more cameras configured to capture one or more images of items passing through a product scanning region of a particular indicia reader; a processor associated with the particular indicia reader; and a memory associated with the particular indicia reader storing instructions that, when executed by the processor, cause the processor to: analyze a first set of one or more images, captured by the one or more cameras, to decode a first indicia associated with a first item in the first set of one or more images, resulting in a decoded first indicia value; analyze the first set of one or more images to determine one or more first parameters related to one or more characteristics of the first item in the first set of one or more images; store the first parameters related to one or more characteristics of the first item in the first set of one or more images locally on the memory; analyze a second set of one or more images, captured by the one or more cameras, to decode a second indicia associated with a second item in the second set of one or more images, resulting in a decoded second indicia value; analyze the second set of one or more images to determine one or more second parameters related to one or more characteristics of the second item in the second set of one or more images; in response to the decoded second indicia value being the same as the decoded first indicia value, compare the one or more second parameters to the one or more first parameters; and generate an alert based on a difference between the second parameters and the first parameters exceeding a difference threshold.

In a variation of this embodiment, the instructions, when executed by the processor, further cause the processor to: delete the first parameters that are stored locally on the memory responsive to one or more of: (i) the completion of a scan session at the indicia reader, (ii) a reboot of the indicia reader, or (iii) the memory associated with the particular indicia reader exceeding a storage limit.

Additionally, in a variation of this embodiment, the instructions, when executed by the processor, further cause the processor to: receive, from an authorized user, an override of the alert; and responsive to receiving the override of the alert from the authorized user, either: (i) replace the first parameters that are stored locally on the memory with the second parameters; or (ii) store the second parameters, with the first parameters, locally on the memory.

Furthermore, in a variation of this embodiment, the first characteristics and the second characteristics include one or more of: color characteristics, size characteristics, shape characteristics, and surface characteristics, with surface characteristics including one or more of curvature characteristics and texture characteristics.

Moreover, in a variation of this embodiment, the one or more cameras include one or more three-dimensional cameras, and analyzing the first set of one or more images to determine the first parameters, and analyzing the second set of one or more images to determine the second parameters, includes analyzing one or more three-dimensional images captured by the one or more three-dimensional cameras to determine the first parameters and second parameters.

Additionally, in a variation of this embodiment, analyzing the first set of one or more images to determine the one or more first characteristics associated with the first item includes analyzing the first set of one or more images using optical character recognition (OCR) techniques to identify one or more first words associated with the first item; analyzing the second set of one or more images to determine the one or more second characteristics associated with the second item includes analyzing the second set of one or more images using OCR techniques to identify one or more second words associated with the second item; and comparing the one or more second parameters to the one or more first parameters includes comparing the one or more second words to the one or more first words.

Furthermore, in a variation of this embodiment, analyzing the first set of one or more images to determine the one or more first characteristics associated with the first item includes analyzing the first set of one or more images to identify a first distance from the first indicia associated with the first item to one or more edges associated with the first item; analyzing the second set of one or more images to determine the one or more second characteristics associated with the second item includes analyzing the second set of one or more images to identify a second distance from the second indicia associated with the second item to one or more edges associated with the second item; and comparing the one or more second parameters to the one or more first parameters includes comparing the one or more second distance to the one or more first distance.

Moreover, in a variation of this embodiment, analyzing the first set of one or more images to determine the one or more first characteristics associated with the first item includes analyzing the first set of one or more images to: identify a first set of one or more pixels extending from the first indicia associated with the first item in a first direction with respect to the orientation of the first indicia; and determine a first set of respective changes in contrast between sequential pixels of the first set of one or more pixels extending from the first indicia associated with the first item in the first direction with respect to the orientation of the first indicia; and analyzing the second set of one or more images to determine the one or more second characteristics associated with the second item includes analyzing the second set of one or more images to: identify a second set of one or more pixels extending from the second indicia associated with the first item in the same first direction with respect to the orientation of the second indicia; and determine a second set of respective changes in contrast between sequential pixels of the second set of one or more pixels extending from the second indicia associated with the second item in the same first direction with respect to the orientation of the second indicia; and comparing the one or more second parameters to the one or more first parameters includes comparing the first set of respective changes in contrast between sequential pixels of the first set of one or more pixels and the second set of respective changes in contrast between sequential pixels of the second set of one or more pixels.

Additionally, in a variation of this embodiment, the system further includes a weighing scale configured to capture weight data associated with items passing through the product scanning region of the indicia reader, and the instructions, when executed by the processor, further cause the processor to: capture, by the weighing scale, first weight data associated with the first item; and capture, by the weighing scale, second weight data associated with the second item; and comparing the one or more second parameters to the one or more first parameters includes comparing the second weight data to the first weight data.

Furthermore, in a variation of this embodiment, the one or more cameras, the memory, and the processor are each positioned within a single housing associated with the particular indicia reader.

Moreover, in a variation of this embodiment, the one or more cameras, the memory, and the processor are each positioned within a threshold distance from the particular indicia reader.

Additionally, in a variation of this embodiment, the alert includes at least one of: (i) pausing a transaction associated with the indicia; (ii) generating an alert to an employee associated with the indicia reader; (iii) capturing, by the one or more cameras, an image or a video of an individual present at the indicia reader at the time that the indicia is decoded; (iv) preventing future transactions of an individual present at the indicia reader at a time that the indicia is decoded; or (v) marking a receipt of a transaction associated with the indicia.

In another embodiment, the present invention is a method for product scanning, comprising: analyzing, by a processor associated with a particular indicia reader, a first set of one or more images of items passing through a product scanning region of the particular indicia reader, captured by one or more cameras, to decode a first indicia associated with a first item in the first set of one or more images, resulting in a decoded first indicia value; analyzing, by the processor, the first set of one or more images to determine one or more first parameters related to one or more characteristics of the first item in the first set of one or more images; storing, by the processor, the first parameters related to one or more characteristics of the first item in the first set of one or more images locally on a memory associated with the particular indicia reader; analyzing, by the processor, a second set of one or more images of items passing through a product scanning region of the particular indicia reader, captured by the one or more cameras, to decode a second indicia associated with a second item in the second set of one or more images, resulting in a decoded second indicia value; analyzing, by the processor, the second set of one or more images to determine one or more second parameters related to one or more characteristics of the second item in the second set of one or more images; in response to the decoded second indicia value being the same as the decoded first indicia value, comparing, by the processor, the one or more second parameters to the one or more first parameters; and generating, by the processor, an alert based on a difference between the second parameters and the first parameters exceeding a difference threshold.

In a variation of this embodiment, the method further includes deleting, by the processor, the first parameters that are stored locally on the memory responsive to one or more of: (i) the completion of a scan session at the indicia reader, (ii) a reboot of the indicia reader, or (iii) the memory associated with the particular indicia reader exceeding a storage limit.

Additionally, in a variation of this embodiment, the method further includes receiving, by the processor, from an authorized user, an override of the alert; and responsive to receiving the override of the alert from the authorized user, either: (i) replacing, by the processor, the first parameters that are stored locally on the memory with the second parameters; or (ii) storing, by the processor, the second parameters, with the first parameters, locally on the memory.

Furthermore, in a variation of this embodiment, the first characteristics and the second characteristics include one or more of: color characteristics, size characteristics, shape characteristics, and surface characteristics, and the surface characteristics include one or more of curvature characteristics and texture characteristics.

Moreover, in a variation of this embodiment, the one or more cameras include one or more three-dimensional cameras, and analyzing the first set of one or more images to determine the first parameters, and analyzing the second set of one or more images to determine the second parameters, includes analyzing one or more three-dimensional images captured by the one or more three-dimensional cameras to determine the first parameters and second parameters.

Additionally, in a variation of this embodiment, analyzing the first set of one or more images to determine the one or more first characteristics associated with the first item includes analyzing the first set of one or more images using optical character recognition (OCR) techniques to identify one or more first words associated with the first item; analyzing the second set of one or more images to determine the one or more second characteristics associated with the second item includes analyzing the second set of one or more images using OCR techniques to identify one or more second words associated with the second item; and comparing the one or more second parameters to the one or more first parameters includes comparing the one or more second words to the one or more first words.

Furthermore, in a variation of this embodiment, analyzing the first set of one or more images to determine the one or more first characteristics associated with the first item includes analyzing the first set of one or more images to identify a first distance from the first indicia associated with the first item to one or more edges associated with the first item; analyzing the second set of one or more images to determine the one or more second characteristics associated with the second item includes analyzing the second set of one or more images to identify a second distance from the second indicia associated with the second item to one or more edges associated with the second item; and comparing the one or more second parameters to the one or more first parameters includes comparing the one or more second distance to the one or more first distance.

Moreover, in a variation of this embodiment, analyzing the first set of one or more images to determine the one or more first characteristics associated with the first item includes analyzing the first set of one or more images to: identify a first set of one or more pixels extending from the first indicia associated with the first item in a first direction with respect to the orientation of the first indicia; and determine a first set of respective changes in contrast between sequential pixels of the first set of one or more pixels extending from the first indicia associated with the first item in the first direction with respect to the orientation of the first indicia; analyzing the second set of one or more images to determine the one or more second characteristics associated with the second item includes analyzing the second set of one or more images to: identify a second set of one or more pixels extending from the second indicia associated with the first item in the same first direction with respect to the orientation of the second indicia; and determine a second set of respective changes in contrast between sequential pixels of the second set of one or more pixels extending from the second indicia associated with the second item in the same first direction with respect to the orientation of the second indicia; and comparing the one or more second parameters to the one or more first parameters includes comparing the first set of respective changes in contrast between sequential pixels of the first set of one or more pixels and the second set of respective changes in contrast between sequential pixels of the second set of one or more pixels.

Additionally, in a variation of this embodiment, the method further includes capturing, by a weighing scale configured to capture weight data associated with items passing through the product scanning region of the indicia reader, first weight data associated with the first item; and capturing, by the weighing scale, second weight data associated with the second item; and comparing the one or more second parameters to the one or more first parameters includes comparing the second weight data to the first weight data.

Furthermore, in a variation of this embodiment, the one or more cameras, the memory, and the processor are each positioned within a single housing associated with the particular indicia reader.

Additionally, in a variation of this embodiment, the one or more cameras, the memory, and the processor are each positioned within a threshold distance from the particular indicia reader.

Moreover, in a variation of this embodiment, the alert includes at least one of: (i) pausing a transaction associated with the indicia; (ii) generating an alert to an employee associated with the indicia reader; (iii) capturing, by the one or more cameras, an image or a video of an individual present at the indicia reader at the time that the indicia is decoded; (iv) preventing future transactions of an individual present at the indicia reader at a time that the indicia is decoded; or (v) marking a receipt of a transaction associated with the indicia.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides techniques for detecting the misplacement of barcodes or other indicia, such as a QR code, or other visual symbology that encodes a payload. Instead, with each scan, overall characteristics (e.g., shape, color, dimensions, etc.) of the scanned item for each barcode may be stored locally. Subsequently, if the same barcode (e.g., during the same transaction, or during subsequent transactions using the same indicia reader) is associated with an item that does not match the previous locally stored characteristics, an instance of barcode misplacement may be identified, i.e., because a barcode has been encountered on an item that does not match the characteristics of a previous item associated with the same barcode. For instance, the techniques provided herein may provide advantages in instances of barcode misplacement in which, during the same transaction, a user positions an inexpensive item in front of a first expensive item, and subsequently positions the same inexpensive item in front of a second expensive item that is packaged differently. As another example, the techniques provided herein may provide advantages in instances of barcode misplacement in which a first user scans an inexpensive item normally, and a second user positions the inexpensive item in front of a more expensive item. Advantageously, the techniques provided herein may omit steps that are required by other implementations, and may provide advantages over systems that must generate, store, and frequently access a large database of item identification information in order to detect instances of barcode misplacement.

Figure 1:
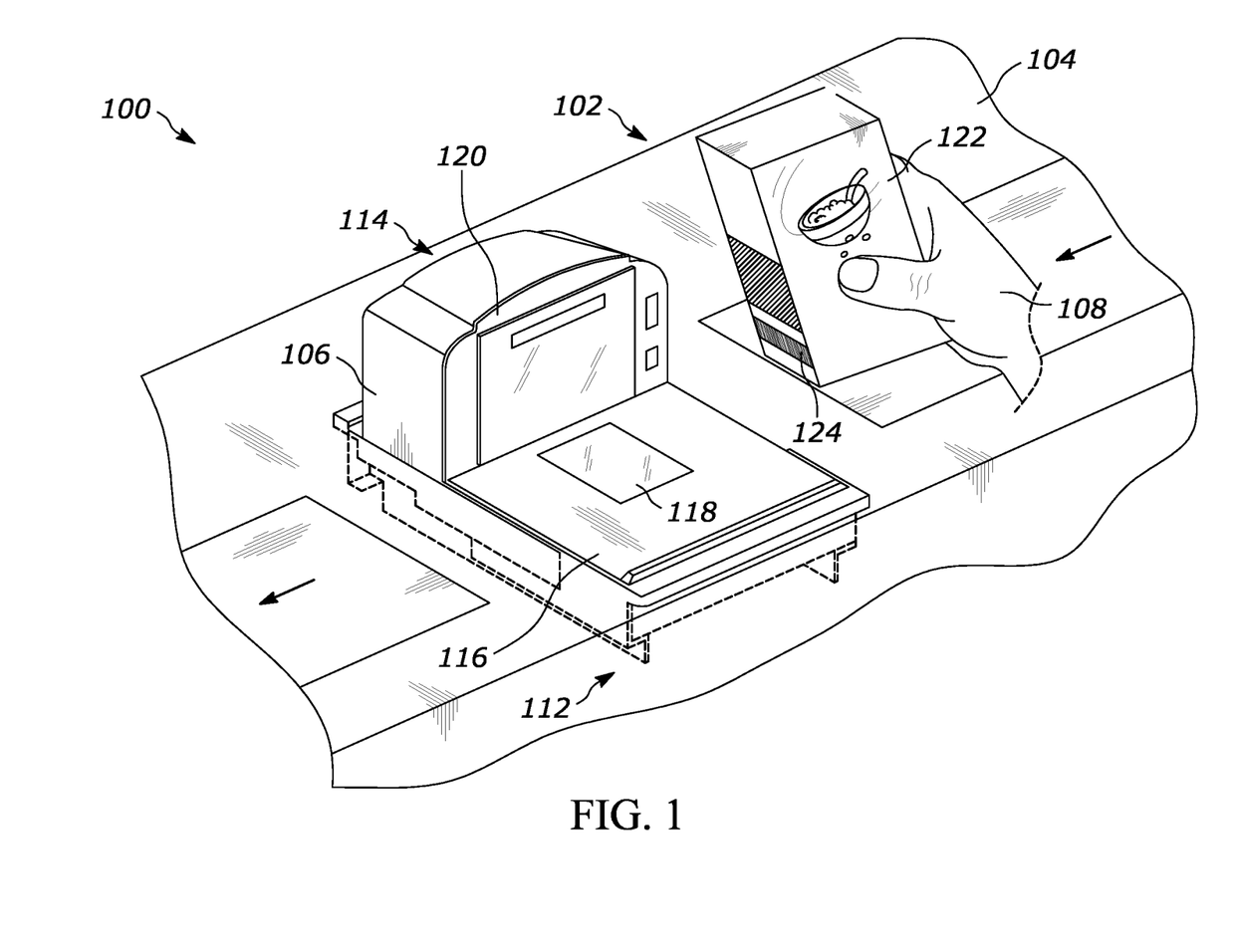
FIG. 1 is a perspective view of an example imaging system, implemented in an example indicia reader, having a bi-optical (also referred to as "bi-optic") imager, showing capture of an image of an object.

FIG. 1 illustrates a perspective view of an example imaging system capable of implementing operations of the example methods described herein, as may be represented by the flowcharts of the drawings that accompany this description. In the illustrated example, an imaging system 100 is in the form of a indicia reader, having a workstation 102 with a counter 104, a bi-optical (also referred to as "bi-optic") indicia reader 106.

Imaging systems herein may include any number of imagers housed in any number of different devices. While FIG. 1 illustrates an example bi-optic indicia reader 106 as the imager, in other examples, the imager may be a handheld device, such as a handheld indicia reader, or a fixed imager, such as indicia reader held in place in a base and operated within what is termed a "presentation mode," a slot scanner, or any other suitable indicia reader.

In the illustrated example, the indicia reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the indicia reader 106. In some examples, the top portion 116 may include a removable or a non-removable platter (e.g., a weighing platter including an electronic weighing scale).

In the illustrated example of FIG. 1, the indicia reader 106 captures images of an object, in particular an item 122, such as, e.g., a package or a produce item. In some implementations, the indicia reader 106 captures these images of the item 122 through one of the first and second optically transmissive windows 118, 120. For example, image capture may be done by positioning the item 122 within the fields of view (FOV) of one or more digital imaging sensor(s) housed inside the indicia reader 106. The indicia reader 106 may capture images of items 122 passing through a product scanning region of the indicia reader, and images of an indicia 124 (such as a barcode, QR code, or other visual symbology that encodes a payload) attached thereto, through these windows 118, 120. For instance, these digital imaging sensors may include one or more black-and-white cameras, one or more color cameras, one or more two-dimensional cameras, one or more three-dimensional cameras, etc. Moreover, these digital imaging sensors may be positioned at various locations inside and/or near the indicia reader 106.

Figure 2A:
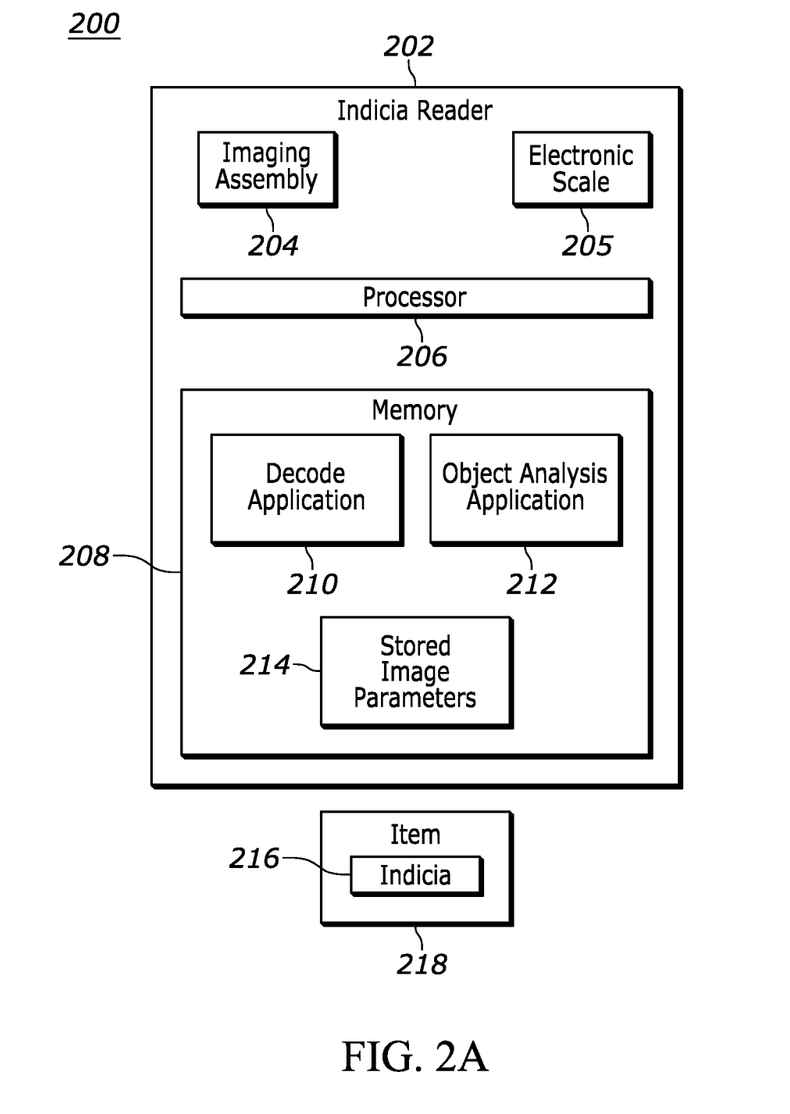
FIG. 2A illustrates a block diagram of an example system for implementing example methods and/or operations described herein including techniques for identifying instances of barcode misplacement based on repetitive product detection.

FIG. 2A illustrates an example system 200 where embodiments of the present invention may be implemented, such as the imaging system 100 of FIG. 1, where various items may be scanned for completing a purchase of an item.

In the illustrated example, the system 200 includes a indicia reader 202. The indicia reader 202 may include an imaging assembly 204, and an electronic scale 205. For example, the imaging assembly 204, and/or electronic scale 205 may be included within a housing of the indicia reader 202. The imaging assembly 206 may include one or more digital imaging sensors, which may include one or more black-and-white cameras, one or more color cameras, one or more two-dimensional cameras, one or more three-dimensional cameras, etc. One or more of the digital imaging sensors of the imaging assembly 206 may be optimized to capture image data for decoding an indicia 216 (such as a barcode, QR code, or other visual symbology that encodes a payload). Additionally, one or more of the digital imaging sensors of the imaging assembly 206 may be optimized to capture image data for vision techniques, such as identifying items 218 to which indicia 216 are affixed, or characteristics thereof. The electronic weighing scale 205 may include a weighing platter configured to measure a weight associated with the item 218.

The indicia reader 202 may include a processor 206, which may be, for example, a microprocessor, controller, and/or any suitable type of processor, and a memory 208 accessible by the processor 206. The processor 206 and the memory 208 may be included within the housing of the indicia reader 202. The processor 206 may interact with the memory 208 to obtain, for example, machine-readable instructions stored in the memory 208 corresponding to, for example, the operations represented by the flowcharts of this disclosure, including those of FIG. 3. In particular, the instructions stored in the memory 208, when executed by the processor 206, may cause the processor 206 to receive and analyze signals generated by the imaging assembly 204 and/or the electronic scale 205. For example, the memory 208 may include a decode application 210 and an object analysis application 212.

Generally speaking, executing the decode application 210 may include analyzing images that include the indicia 216 (e.g., as captured by the imaging assembly 204) in order to decode the indicia 216, resulting in a decoded indicia value. For instance, in some examples, decoded indicia values may be alphanumeric codes or values associated with each indicia 216. Moreover, in some examples, decoded indicia values may include indications of items 218 to which the indicia 216 is affixed, e.g., items 218 corresponding to the alphanumeric codes or values associated with each indicia 216. For instance, the memory 208 may store a listing of items that are associated with the alphanumeric codes or values associated of each indicia 216, and the decode application 210 may identify an item 218 associated with an indicia 216 based on comparing the decoded indicia value to the listing.

Executing the object analysis application 212 may include capturing images of items 218 associated with each indicia value decoded by the decode application 210 (e.g., via the imaging assembly 204), identifying characteristics of items in these images, and storing parameters 214 associated with these characteristics in the memory 208.

For example, the stored parameters 214 may be associated with characteristics including color characteristics, size characteristics, shape characteristics, surface characteristics (e.g., curvature characteristics and texture characteristics), etc., associated with the item 218 in the captured images. Additionally, the stored parameters 214 may be associated with characteristics including words or numbers associated with the item 218 in the captured images. For instance, the object analysis application 212 may analyze the captured images using optical character recognition (OCR) techniques to identify words such as brand names, descriptions, item names, etc., associated with the item 218 in the captured images. Furthermore, the stored parameters 214 may be associated with characteristics including a distance between the indicia 216 and one or more edges associated with the item 218 in the images. Moreover, the stored parameters 214 may be associated with characteristics including specific pixel characteristics associated with a particular identifiable portion of the item 218 in the images, such as specific colors of pixels surrounding the indicia 216 on the item 218 in the images, contrast differences between sequential pixels surrounding the indicia 216 on the item 218 in the images, etc. In some examples, the parameters 214 may be associated with other non-image related characteristics of the items 218, such as, for example, weights associated with the items 218 as determined by the electronic scale 205.

Given the limited capacity of the memory 208, the object analysis application 212 (or another application) may subsequently delete these stored parameters 214 at various intervals, such as at the completion of each scan session at the indicia reader 202 (which may be determined, e.g., by the indicia reader 202 measuring an idle period greater than a threshold idle period, a new person in the images captured by the imaging assembly 204, etc.), at each reboot of the indicia reader 202, based on a storage limit of the memory 208 being exceeded, etc. Additionally, stored parameters 214 that appear to be outliers for a given indicia decode value may be deleted as well.

As more indicia values associated with more items 218 are decoded, the object analysis application 212 may compare subsequent parameters associated with a given decoded indicia value to previously stored parameters 214 (that remain in the memory 208) that are associated with the same decoded indicia value. The object analysis application 212 may detect instances of barcode misplacement based on differences between previous parameters 214 and subsequent parameters associated with the same decoded indicia value, e.g., based on a number of parameters that are different, based on the extent to which the parameters are different (for instance, the difference being greater than a threshold difference), etc.

Figure 2B:
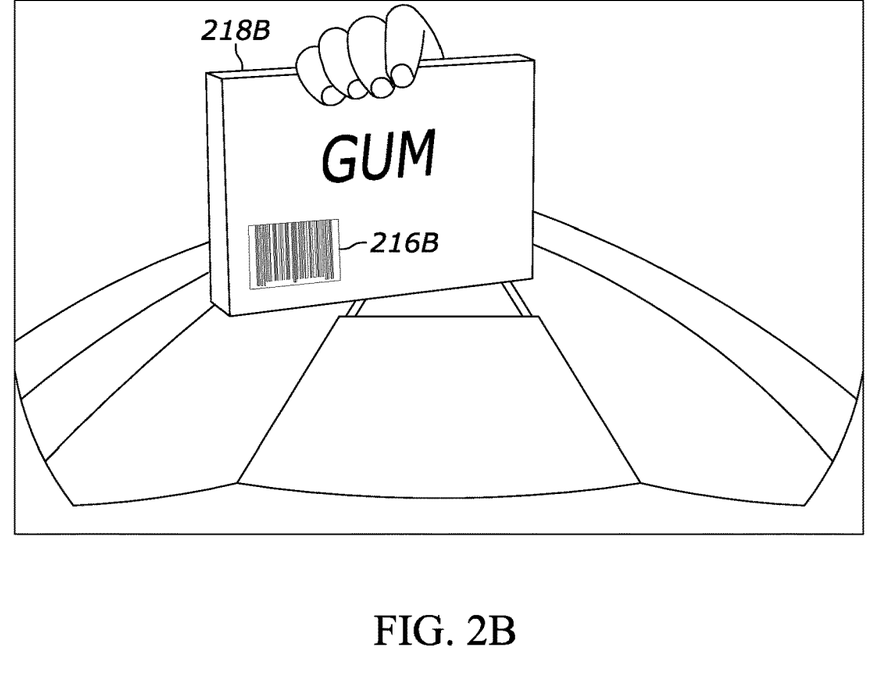
FIGS. 2B and 2C illustrate an example of the same indicia affixed to two different items.
Figure 2C:
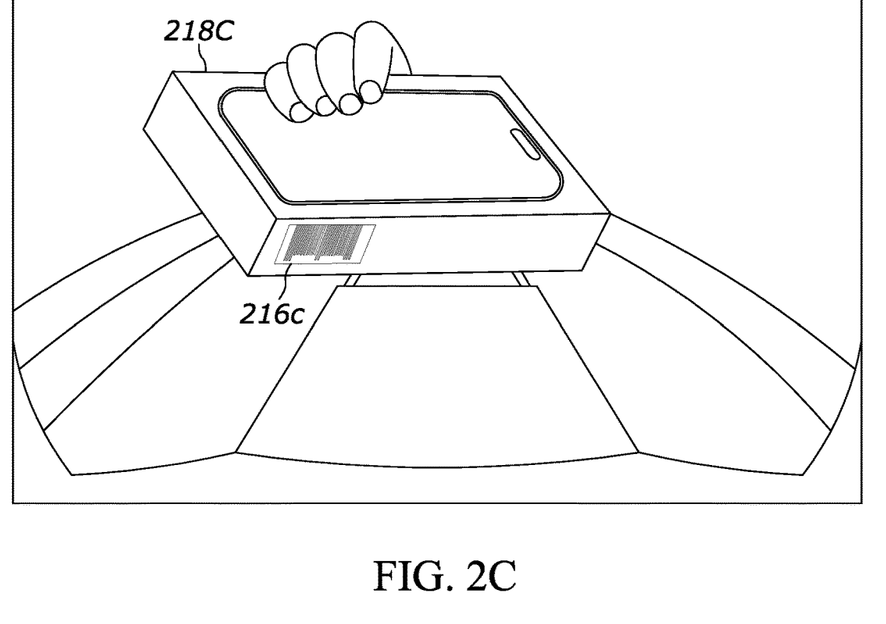

For instance, FIGS. 2B and 2C illustrate an example of the same indicia affixed to two different items. That is, as shown at FIG. 2B, an indicia 216B may be affixed to a pack of gum item 218B. As shown at FIG. 2C, an indicia 216C may be affixed to an item 218C that is a box containing a smart phone. Given the differences in appearance, size, weight, color, and other characteristics of the item 218B and 218C, if the indicia 216B encodes the same value as the indicia 216C, the object analysis application 212 may detect an instance of barcode misplacement based on images of the items 218B and 218C.

The object analysis application 212 may trigger one or more mitigation actions based on detected instances of barcode misplacement.

For instance, in some examples, the mitigation actions may include the indicia reader 202 refraining from transmitting an indication of a successful decode of the indicia to a host server. Additionally, in some examples, the mitigation actions may include the imaging assembly 204 capturing an image or a video of an individual present at the indicia reader at the time that the indicia is decoded. Moreover, the mitigation actions may include triggering an audible or visible alert, e.g., via an audible or visual indicator associated with the indicia reader 202, such as an LED. Furthermore, in some examples, the mitigation actions may include the object analysis application 212 sending a signal to a host computing device (i.e., a POS computing device), such that the host computing device may perform other mitigation actions, such as pausing a transaction associated with the indicia 216, generating an alert to an employee associated with the indicia reader 202, preventing future transactions of an individual who is present at the indicia reader at a time that the indicia 216 is decoded, marking a receipt of a transaction associated with the indicia 216, etc.

Figure 3:
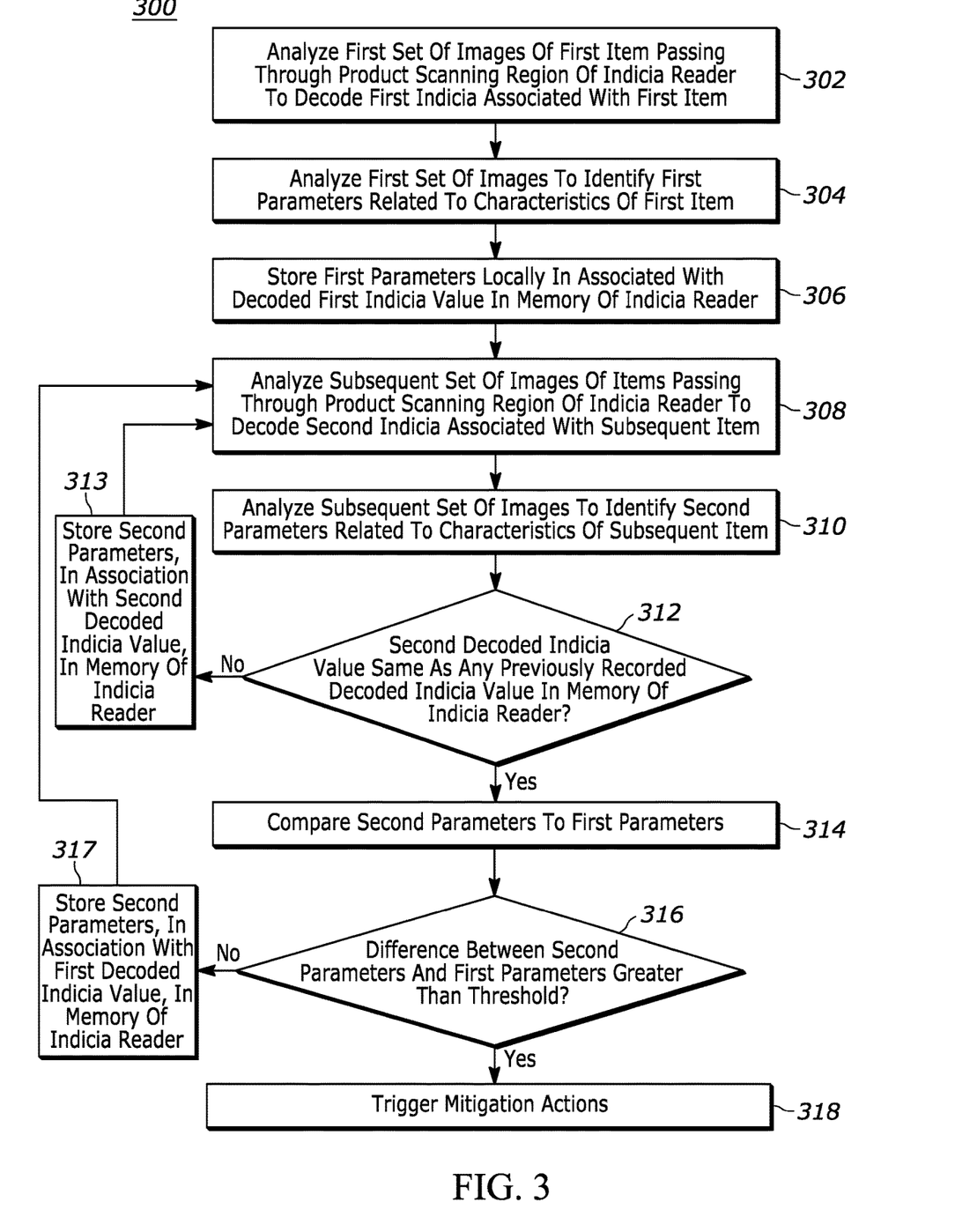
FIG. 3 illustrates a block diagram of an example process as may be implemented by the logic circuit of FIG. 2A, for implementing example methods and/or operations described herein including techniques for identifying instances of barcode misplacement based on repetitive product detection.

FIG. 3 illustrates a block diagram of an example process 300 as may be implemented by the logic circuit of FIG. 2A, for implementing example methods and/or operations described herein including techniques for identifying instances of barcode misplacement based on repetitive product detection, as may be performed by the imaging system 100 in FIG. 1 or by the indicia reader 202 in FIG. 2A.

At block 302, a first set of images (e.g., one or more images) of a first item passing through a product scanning region of a particular indicia reader (e.g., indicia reader 202), captured by one or more cameras (e.g., cameras associated with the imaging assembly 204, which may include two-dimensional cameras, three-dimensional cameras, black-and-white cameras, color cameras, etc.), may be analyzed to decode a first indicia associated with a first item in the first set of images, resulting in a decoded first indicia value.

At block 304, the first set of images may be analyzed to determine one or more first parameters related to one or more characteristics of the first item in the first set of images. Analyzing the first set of images may include segmenting the first item from the background in the first set of images, and applying one or more image transformations (including, e.g., rectifying the first item in the first set of images based on the indicia in the first set of images). Moreover, any other appropriate image processing/analysis may be done in order to enable determining the first parameters related to the one or more characteristics of the first item in the first set of images.

For instance, the characteristics may include one or more of color characteristics, size characteristics, shape characteristics, and/or surface characteristics. Surface characteristics may include one or more of curvature characteristics and texture characteristics. The first parameters may include parameters associated with one or more of these characteristics. For instance, these first parameters may be numerical parameters or categorical parameters. As an example, parameters associated with color characteristics of the first item may include scaled numerical indications of the various colors associated with the first item, such as hex color codes. As another example, parameters associated with the size of the item may include a numerical indication of an estimated volume, height, width, etc., of the first item, or a categorical indication of a range of volumes, heights, widths, etc., for the first item. Additionally, parameters associated with the shape of the first item may include a categorical indication of one of several possible shapes commonly associated with items to be purchased, such as a can shape, a bottle shape, a box shape, etc. As another example, parameters associated with the first item may include a distance from the first indicia associated with the first item to one or more edges associated with the first item. Furthermore, parameters associated with the first item may include visual embedding parameters associated with the segmented image of the first item.

Furthermore, as another example, parameters associated with the first item may include changes in contrast between sequential pixels of a set of one or more pixels extending from the first indicia associated with the first item in a first direction with respect to the orientation of the first indicia. That is, a set of pixels extending out from a particular corner or edge of the first indicia (e.g., upper right corner, upper left corner, lower right corner, lower left corner, upper edge, lower edge, left edge, right edge, etc.) when the indicia is oriented in a particular direction may be analyzed to determine differences in contrast between each sequential pixel, and these differences in contrast may be considered parameters associated with the first item.

Additionally, in some examples, analyzing the first set of images to determine the one or more first parameters related to the one or more characteristics associated with the first item may include analyzing the first set of images using optical character recognition (OCR) techniques to identify one or more words associated with the first item. For instance, the one or more words may include words related to brand names of the item, words related to the type of item, or any other words that are printed on or affixed to the item.

Furthermore, in some examples, in addition to determining parameters from the first set of images, the method 300 may include determining weight parameters associated with the first item, e.g., by capturing a weight associated with the first item using a weighing scale associated with a indicia reader.

At block 306, the parameters associated with the first item in the first set of images may be stored, in association with the first decoded indicia, locally on a memory (e.g., memory 208) of the particular indicia reader. For instance, storing the images locally may include storing the images on a memory that is positioned within a single housing associated with the particular indicia reader, along with the processor and cameras. In some examples, the method 300 may include initially storing these first parameters locally and subsequently deleting these first parameters, e.g., based on the completion of a scan session at the indicia reader, a reboot of the indicia reader, and/or the memory exceeding a storage limit.

At block 308, a subsequent set of images (e.g., one or more images) of a subsequent item passing through the product scanning region of the particular indicia reader may be analyzed to decode a second indicia associated with the subsequent item in the subsequent set of images, resulting in a decoded second indicia value.

At block 310, the subsequent set of images may be analyzed to determine one or more second parameters related to one or more characteristics of the subsequent item in the subsequent set of images. Analyzing the subsequent set of images may include segmenting the subsequent item from the background in the subsequent set of images, and applying one or more image transformations (including, e.g., rectifying the subsequent item in the subsequent set of images based on the indicia in the subsequent set of images). Moreover, any other appropriate image processing/analysis may be done in order to enable determining the first parameters related to the one or more characteristics of the subsequent item in the subsequent set of images.

For instance, as discussed above in the discussion of block 304, with respect to the characteristics of the first item, the characteristics of the subsequent item may include one or more of color characteristics, size characteristics, shape characteristics, and/or surface characteristics. Surface characteristics may include one or more of curvature characteristics and texture characteristics. The second parameters may include parameters associated with one or more of these characteristics. For instance, these parameters may be numerical parameters or categorical parameters. As an example, parameters associated with color characteristics of the subsequent item may include scaled numerical indications of the various colors associated with the first item, such as hex color codes. As another example, parameters associated with the size of the subsequent item may include a numerical indication of an estimated volume, height, width, etc., of the second item, or a categorical indication of a range of volumes, heights, widths, etc., for the second item. Additionally, parameters associated with the shape of the subsequent item may include a categorical indication of one of several possible shapes commonly associated with items to be purchased, such as a can shape, a bottle shape, a box shape, etc. As another example, parameters associated with the subsequent item may include a distance from the second indicia associated with the subsequent item to one or more edges associated with the subsequent item. Furthermore, parameters associated with the subsequent item may include visual embedding parameters associated with the segmented image of the subsequent item.

Furthermore, as another example, parameters associated with the subsequent item may include changes in contrast between sequential pixels of a set of one or more pixels extending from the second indicia associated with the second item in a particular direction with respect to the orientation of the second indicia. That is, a set of pixels extending out from a particular corner or edge of the first indicia (e.g., upper right corner, upper left corner, lower right corner, lower left corner, upper edge, lower edge, left edge, right edge, etc.) when the indicia is oriented in a particular direction may be analyzed to determine differences in contrast between each sequential pixel, and these differences in contrast may be considered parameters associated with the subsequent item.

Additionally, in some examples, analyzing the subsequent set of images to determine the one or more second parameters related to the one or more characteristics associated with the subsequent item may include analyzing the first set of images using OCR to identify one or more words associated with the subsequent item. For instance, the one or more words may include words related to brand names of the item, words related to the type of item, or any other words that are printed on or affixed to the item.

Furthermore, in some examples, in addition to determining parameters from the subsequent set of images, the method 300 may include determining weight parameters associated with the subsequent item, e.g., by capturing a weight associated with the subsequent item using a weighing scale associated with a indicia reader.

At block 312, a determination may be made as to whether the second indicia value is the same as the first indicia value, or any other previously decoded indicia value stored to the memory of the indicia reader. If the second indicia value is not the same as the first indicia value (block 312, NO), the method may proceed to block 313, where the second parameters related to the characteristics of the subsequent item may be stored, in association with the second decoded indicia value, in the memory of the indicia reader. The method may then proceed to block 308, as more items pass through the product scanning region and more images are analyzed. If the second indicia value is the same as the first indicia value (block 312, YES), the one or more second parameters may be compared to the one or more first parameters at block 314.

At block 316, a determination may be made as to whether any difference between the second parameters and the first parameters exceeds a threshold difference. For instance, this determination may include determining whether numerical parameters associated with the second item differ from numerical parameters associated with the second item by greater than a threshold amount (e.g., whether an estimated volume of the second item is within 5 cubic centimeters of an estimated volume of the first item). Furthermore, in some examples, this determination may include determining whether categorical parameters associated with the second item are the same as categorical parameters associated with the first item (e.g., whether the second item is categorized as being a can shape, and the first item is also characterized as being a can shape). Moreover, in some examples, this determination may include comparing a calculated distance from the second indicia to one or more edges of the second item to a calculated distance from the first indicia to one or more edges of the first item, i.e., to determine whether these calculated distances differ by more than a threshold amount (e.g., whether the second distance differs from the first distance by more than 1 cm).

Furthermore, in some examples, this determination may include comparing changes in contrast between sequential pixels extending in a particular direction from the second indicia associated with the second item to changes in contrast between sequential pixels extending in the same direction from the first indicia associated with the first item, i.e., to determine whether each sequential change in contrast for a given two pixels of the images associated with the second item correspond to sequential changes in contrast for a corresponding two pixels of the images associated with the first item, or whether these sequential changes in contrast for the second item are different from corresponding sequential changes in contrast for the first item by greater than a threshold amount of contrast.

Additionally, in some examples, this determination may include determining whether words associated with the second item as identified using OCR techniques are the same as, or differ from, words associated with the first item as identified using OCR techniques, and/or determining whether there are any words in common between the second item and the first item.

Furthermore, in some examples, this determination may include determining whether a weight parameter associated with the second item differs from a weight parameter associated with the first item by greater than a threshold amount of weight (e.g., a difference of greater than one ounce, a difference of greater than two ounces, etc.).

If any difference between the second parameters and the first parameters does not exceed the threshold difference (block 316, NO), the method 300 may include sending the payload of the decoded first/second indicia to a host computing device, such that a transaction may be completed. Furthermore, the method 300 may proceed to block 317, where the second parameters related to the characteristics of the subsequent item may be stored, in association with the first decoded indicia value, in the memory of the indicia reader. For instance, if any difference between the second parameters and the first parameters does not exceed the threshold difference, the second parameters related to the characteristics of the subsequent item may be augmented to, averaged with, or otherwise combined with the first parameters related to the characteristics of the first item in the memory of the indicia reader.

Moreover, the method 300 may proceed to block 302 or block 308, as more items pass through the product scanning region and more images are analyzed. If the difference between the second parameters and the first parameters exceeds the threshold difference (block 316, YES), one or more mitigation actions may be triggered at block 318.

For instance, in some examples, the mitigation actions may include the indicia reader refraining from transmitting an indication of a successful decode of the indicia to a host computing device (e.g., a POS computing device). Additionally, in some examples, the mitigation actions may include the indicia reader capturing an image or a video of an individual present at the indicia reader at the time that the indicia is decoded. Moreover, the mitigation actions may include the indicia reader triggering an audible or visible alert, e.g., via an audible or visual indicator associated with the indicia reader, such as an LED. Furthermore, in some examples, the mitigation actions may include sending a signal to the host computing device, such that the host computing device may perform other mitigation actions, such as pausing a transaction associated with the indicia, generating an alert to an employee associated with the indicia reader, preventing future transactions of an individual who is present at the indicia reader at a time that the indicia is decoded, marking a receipt of a transaction associated with the indicia, etc.

In some examples, the method 300 may further include receiving an override of the alert from an authorized user (e.g., who may be authorized based on logging in to the indicia reader 202). For instance, responsive to receiving the override of the alert, the method 300 may include replacing the first parameters that are stored locally on the memory with the second parameters, or otherwise storing the second parameters with the first parameters locally on the memory.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for product scanning, comprising:
one or more cameras configured to capture one or more images of items passing through a product scanning region of a particular indicia reader;
a processor associated with the particular indicia reader; and
a memory associated with the particular indicia reader storing instructions that, when executed by the processor, cause the processor to:
perform pixel-level analysis of a first set of one or more images, captured by the one or more cameras, to decode a first indicia associated with a first item in the first set of one or more images, resulting in a decoded first indicia value;
perform pixel-level analysis of the first set of one or more images to determine one or more first parameters related to one or more characteristics of the first item in the first set of one or more images;
store the first parameters related to one or more characteristics of the first item in the first set of one or more images locally on the memory;
perform pixel-level analysis of a second set of one or more images, captured by the one or more cameras, to decode a second indicia associated with a second item in the second set of one or more images, resulting in a decoded second indicia value;
perform pixel-level analysis of the second set of one or more images to determine one or more second parameters related to one or more characteristics of the second item in the second set of one or more images;
in response to the decoded second indicia value being the same as the decoded first indicia value, compare the one or more second parameters to the one or more first parameters; and
generate an alert based on a difference between the second parameters and the first parameters exceeding a difference threshold.

2. The system of claim 1, wherein the instructions, when executed by the processor, further cause the processor to:
delete the first parameters that are stored locally on the memory responsive to one or more of: (i) the completion of a scan session at the indicia reader, (ii) a reboot of the indicia reader, or (iii) the memory associated with the particular indicia reader exceeding a storage limit.

3. The system of claim 1, wherein the instructions, when executed by the processor, further cause the processor to:
receive, from an authorized user, an override of the alert;
responsive to receiving the override of the alert from the authorized user, either:
(i) replace the first parameters that are stored locally on the memory with the second parameters; or
(ii) store the second parameters, with the first parameters, locally on the memory.

4. The system of claim 1, wherein the first characteristics and the second characteristics include one or more of: color characteristics, size characteristics, shape characteristics, and surface characteristics, wherein surface characteristics include one or more of curvature characteristics and texture characteristics.

5. The system of claim 1, wherein the one or more cameras include one or more three-dimensional cameras, and wherein performing pixel-level analysis of the first set of one or more images to determine the first parameters, and performing pixel-level analysis of the second set of one or more images to determine the second parameters includes performing pixel-level analysis of one or more three-dimensional images captured by the one or more three-dimensional cameras to determine the first parameters and second parameters.

6. The system of claim 1, wherein performing pixel-level analysis of the first set of one or more images to determine the one or more first characteristics associated with the first item includes performing pixel-level analysis of the first set of one or more images using optical character recognition (OCR) techniques to identify one or more first words associated with the first item;
wherein performing pixel-level analysis of the second set of one or more images to determine the one or more second characteristics associated with the second item includes performing pixel-level analysis of the second set of one or more images using OCR techniques to identify one or more second words associated with the second item; and
wherein comparing the one or more second parameters to the one or more first parameters includes comparing the one or more second words to the one or more first words.

7. The system of claim 1, wherein performing pixel-level analysis of the first set of one or more images to determine the one or more first characteristics associated with the first item includes performing pixel-level analysis of the first set of one or more images to identify a first distance from the first indicia associated with the first item to one or more edges associated with the first item;
wherein performing pixel-level analysis of the second set of one or more images to determine the one or more second characteristics associated with the second item includes performing pixel-level analysis of the second set of one or more images to identify a second distance from the second indicia associated with the second item to one or more edges associated with the second item; and
wherein comparing the one or more second parameters to the one or more first parameters includes comparing the one or more second distance to the one or more first distance.

8. The system of claim 1, wherein performing pixel-level analysis of the first set of one or more images to determine the one or more first characteristics associated with the first item includes performing pixel-level analysis of the first set of one or more images to:
identify a first set of one or more pixels extending from the first indicia associated with the first item in a first direction with respect to the orientation of the first indicia; and
determine a first set of respective changes in contrast between sequential pixels of the first set of one or more pixels extending from the first indicia associated with the first item in the first direction with respect to the orientation of the first indicia;
wherein performing pixel-level analysis of the second set of one or more images to determine the one or more second characteristics associated with the second item includes performing pixel-level analysis of the second set of one or more images to:
identify a second set of one or more pixels extending from the second indicia associated with the first item in the same first direction with respect to the orientation of the second indicia; and
determine a second set of respective changes in contrast between sequential pixels of the second set of one or more pixels extending from the second indicia associated with the second item in the same first direction with respect to the orientation of the second indicia; and
wherein comparing the one or more second parameters to the one or more first parameters includes comparing the first set of respective changes in contrast between sequential pixels of the first set of one or more pixels and the second set of respective changes in contrast between sequential pixels of the second set of one or more pixels.

9. The system of claim 1, further comprising a weighing scale configured to capture weight data associated with items passing through the product scanning region of the indicia reader, wherein the instructions, when executed by the processor, further cause the processor to:
capture, by the weighing scale, first weight data associated with the first item; and
capture, by the weighing scale, second weight data associated with the second item;
wherein comparing the one or more second parameters to the one or more first parameters includes comparing the second weight data to the first weight data.

10. The system of claim 1, wherein the one or more cameras, the memory, and the processor are each positioned within a single housing associated with the particular indicia reader.

11. The system of claim 1, wherein the one or more cameras, the memory, and the processor are each positioned within a threshold distance from the particular indicia reader.

12. The system of claim 1, wherein the alert includes at least one of: (i) pausing a transaction associated with the indicia; (ii) generating an alert to an employee associated with the indicia reader; (iii) capturing, by the one or more cameras, an image or a video of an individual present at the indicia reader at the time that the indicia is decoded; (iv) preventing future transactions of an individual present at the indicia reader at a time that the indicia is decoded; or (v) marking a receipt of a transaction associated with the indicia.

13. A method for product scanning, comprising:
performing, by a processor associated with a particular indicia reader, pixel-level analysis of a first set of one or more images of items passing through a product scanning region of the particular indicia reader, captured by one or more cameras, to decode a first indicia associated with a first item in the first set of one or more images, resulting in a decoded first indicia value;
performing, by the processor, pixel-level analysis of the first set of one or more images to determine one or more first parameters related to one or more characteristics of the first item in the first set of one or more images;
storing, by the processor, the first parameters related to one or more characteristics of the first item in the first set of one or more images locally on a memory associated with the particular indicia reader;
performing, by the processor, pixel-level analysis of a second set of one or more images of items passing through a product scanning region of the particular indicia reader, captured by the one or more cameras, to decode a second indicia associated with a second item in the second set of one or more images, resulting in a decoded second indicia value;

performing, by the processor, pixel-level analysis of the second set of one or more images to determine one or more second parameters related to one or more characteristics of the second item in the second set of one or more images;

in response to the decoded second indicia value being the same as the decoded first indicia value, comparing, by the processor, the one or more second parameters to the one or more first parameters; and generating, by the processor, an alert based on a difference between the second parameters and the first parameters exceeding a difference threshold.

14. The method of claim 13, further comprising:
deleting, by the processor, the first parameters that are stored locally on the memory responsive to one or more of: (i) the completion of a scan session at the indicia reader, (ii) a reboot of the indicia reader, or (iii) the memory associated with the particular indicia reader exceeding a storage limit.

15. The method of claim 13, further comprising:
receiving, by the processor, from an authorized user, an override of the alert;
responsive to receiving the override of the alert from the authorized user, either:
(i) replacing, by the processor, the first parameters that are stored locally on the memory with the second parameters; or
(ii) storing, by the processor, the second parameters, with the first parameters, locally on the memory.

16. The method of claim 13, wherein the first characteristics and the second characteristics include one or more of: color characteristics, size characteristics, shape characteristics, and surface characteristics, wherein surface characteristics include one or more of curvature characteristics and texture characteristics.

17. The method of claim 13, wherein the one or more cameras include one or more three-dimensional cameras, and wherein performing pixel-level analysis of the first set of one or more images to determine the first parameters, and performing pixel-level analysis of the second set of one or more images to determine the second parameters includes performing pixel-level analysis of one or more three-dimensional images captured by the one or more three-dimensional cameras to determine the first parameters and second parameters.

18. The method of claim 13, wherein performing pixel-level analysis of the first set of one or more images to determine the one or more first characteristics associated with the first item includes performing pixel-level analysis of the first set of one or more images using optical character recognition (OCR) techniques to identify one or more first words associated with the first item;
wherein performing pixel-level analysis of the second set of one or more images to determine the one or more second characteristics associated with the second item includes analyzing the second set of one or more images using OCR techniques to identify one or more second words associated with the second item; and
wherein comparing the one or more second parameters to the one or more first parameters includes comparing the one or more second words to the one or more first words.

19. The method of claim 13, wherein performing pixel-level analysis of the first set of one or more images to determine the one or more first characteristics associated with the first item includes performing pixel-level analysis of the first set of one or more images to identify a first distance from the first indicia associated with the first item to one or more edges associated with the first item;
wherein performing pixel-level analysis of the second set of one or more images to determine the one or more second characteristics associated with the second item includes performing pixel-level analysis of the second set of one or more images to identify a second distance from the second indicia associated with the second item to one or more edges associated with the second item; and
wherein comparing the one or more second parameters to the one or more first parameters includes comparing the one or more second distance to the one or more first distance.

20. The method of claim 13, wherein performing pixel-level analysis of the first set of one or more images to determine the one or more first characteristics associated with the first item includes performing pixel-level analysis of the first set of one or more images to:
identify a first set of one or more pixels extending from the first indicia associated with the first item in a first direction with respect to the orientation of the first indicia; and
determine a first set of respective changes in contrast between sequential pixels of the first set of one or more pixels extending from the first indicia associated with the first item in the first direction with respect to the orientation of the first indicia;
wherein performing pixel-level analysis of the second set of one or more images to determine the one or more second characteristics associated with the second item includes performing pixel-level analysis of the second set of one or more images to:
identify a second set of one or more pixels extending from the second indicia associated with the first item in the same first direction with respect to the orientation of the second indicia; and
determine a second set of respective changes in contrast between sequential pixels of the second set of one or more pixels extending from the second indicia associated with the second item in the same first direction with respect to the orientation of the second indicia; and
wherein comparing the one or more second parameters to the one or more first parameters includes comparing the first set of respective changes in contrast between sequential pixels of the first set of one or more pixels and the second set of respective changes in contrast between sequential pixels of the second set of one or more pixels.

21. The method of claim 13, further comprising:
capturing, by a weighing scale configured to capture weight data associated with items passing through the product scanning region of the indicia reader, first weight data associated with the first item; and
capturing, by the weighing scale, second weight data associated with the second item;
wherein comparing the one or more second parameters to the one or more first parameters includes comparing the second weight data to the first weight data.

22. The method of claim 13, wherein the one or more cameras, the memory, and the processor are each positioned within a single housing associated with the particular indicia reader.

23. The method of claim 13, wherein the one or more cameras, the memory, and the processor are each positioned within a threshold distance from the particular indicia reader.

24. The method of claim 13, wherein the alert includes at least one of: (i) pausing a transaction associated with the indicia; (ii) generating an alert to an employee associated with the indicia reader; (iii) capturing, by the one or more cameras, an image or a video of an individual present at the indicia reader at the time that the indicia is decoded; (iv) preventing future transactions of an individual present at the indicia reader at a time that the indicia is decoded; or (v) marking a receipt of a transaction associated with the indicia.

\* \* \* \* \*